J. J. McGUIRE.
AXLE OILER.
APPLICATION FILED AUG. 4, 1915.
1,185,693.
Patented June 6, 1916.
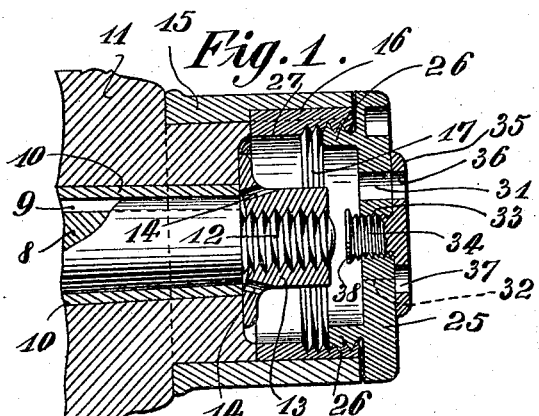
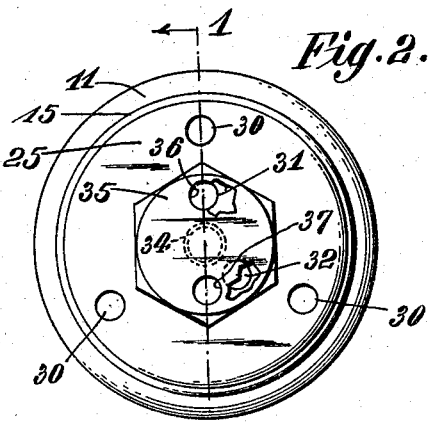
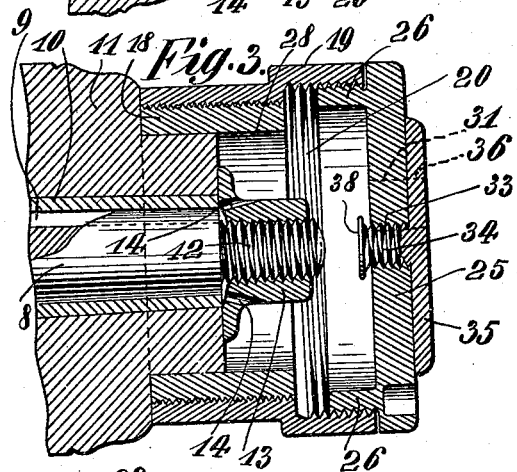
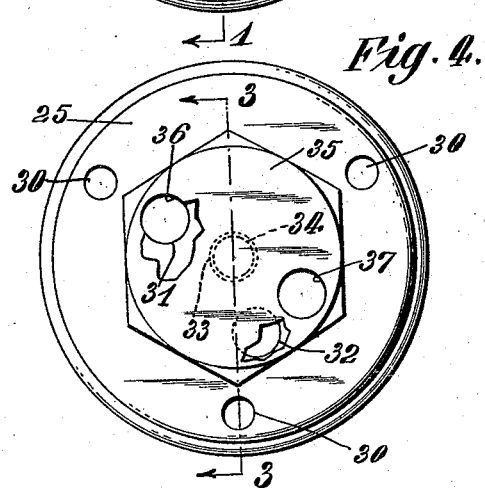
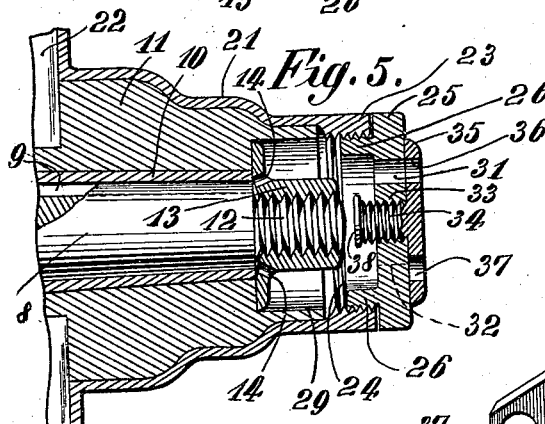
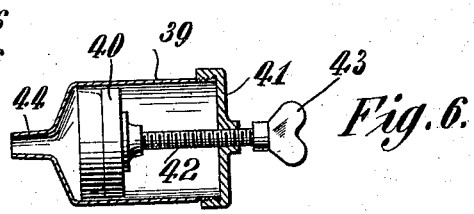
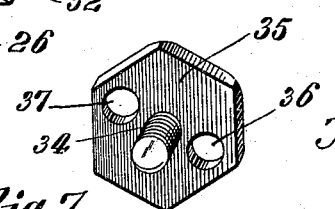
WITNESSES:
Fred. Roegez.
Richard Wegener.
INVENTOR
John J. McGuire
BY
Walton Harrison.
his ATTORNEY

UNITED STATES PATENT OFFICE.

JOHN J. McGUIRE, OF NEW YORK, N. Y.

AXLE-OILER.

1,185,693.  Specification of Letters Patent.  Patented June 6, 1916.

Application filed August 4, 1915. Serial No. 43,529.

*To all whom it may concern:*

Be it known that I, JOHN J. McGUIRE, a citizen of the United States, residing in the city of New York, borough of Manhattan, in the county and State of New York, have invented a new and useful Improvement in Axle-Oilers, of which the following is a full, clear, and exact description.

The purpose of my invention is to facilitate the introduction of axle grease or lubricating oil into the hub or analogous member mounted to turn upon the axle, and admits of several uses, but is of peculiar service as used upon wagons and other wheeled vehicles used upon the road. It is well adapted for use in connection with apparatus of the kind described in my Patent No. 1,142,260, dated June 9, 1915.

Reference is made to the accompanying drawing forming a part of this specification; and in which like numerals indicate like parts.

Figure 1 is a fragmentary vertical section through one form of wagon hub equipped with my invention, and is taken on the line 1—1 of Fig. 2, looking in the direction indicated by the arrows. Fig. 2 is an end elevation of the mechanism shown in Fig. 1. Fig. 3 is a fragmentary section on the line 3—3 of Fig. 4, looking in the direction indicated by the arrows, and shows my invention as applied to a form of hub differing from that appearing in Figs. 1 and 2. Fig. 4 is an end elevation of the device shown in Fig. 3. Fig. 5 is a section somewhat similar to Figs. 1 and 3, but showing my device as applied to still another form of hub. Fig. 6 is a section through a syringe used in connection with my device, for introducing the grease or oil into the grease compartment of the hub. Fig. 7 is a perspective of a closure member forming a part of my device.

A spindle 8 is provided with a grease groove 9. A tapered box is shown at 10, and fits revolubly upon the spindle. The wooden portion of the hub appears at 11, and is revoluble with the tapered box 10, which is practically a part of the hub. The spindle 8 carries a reduced threaded portion 12 and fitted upon the same is a nut 13, provided with grease holes 14, through which the lubricant is fed between the spindle 8 and the tapered box 10, and into the groove 9.

In the form shown in Fig. 1 a band 15, made of metal, carries a member 16 also of metal, secured rigidly to it, or if desired, integral with it. The part 16 is provided internally with a thread 17. The parts 15 and 16 together I designate as a hub collar.

In the form appearing in Fig. 3 a band 18, secured upon the wooden portion 11 of the hub, is threaded externally and carries a hub collar of the form shown at 19, this hub collar being provided internally with a thread 20.

In the structure shown in Fig. 5 the hub number 11, made of wood, carries a metal jacket, reaching from the spokes 22 out to the end of the hub, and provided with a thickened portion 23, the latter carrying internally a thread 24.

I provide a closure cap 25, having an annular portion 26 of reduced diameter, the latter being provided externally with a thread mating the thread 17, 20 or 24, as the case may be, according to the form of hub. The purpose of the closure cap 25 is to close the grease compartment of the hub, this grease compartment having the form shown at 27, 28 or 29, depending upon the type of hub employed.

The closure cap 25 is provided with wrench holes 30 to facilitate the application of a wrench when the closure cap is to be removed. The closure cap is also provided with a pair of charging holes 31, 32 and with a centrally-disposed bolt hole 33, the latter being threaded. The charging holes 31, 32 are located not quite diametrically opposite each other relatively to the axial center of the closure cap 25.

A threaded bolt 34 is revolubly fitted into the threaded hole 33 of the closure cap, and is provided with a large, flat head 35, having in this instance the general outline of a hexagon, in order to facilitate the use of a wrench upon it. The head 35 is provided with charging holes 36, 37 in this instance two in number and disposed diametrically opposite each other. Each charging hole 36, 37 of this head 35 is adapted to register with either one of the charging holes 31, 32 of the closure cap.

The bolt 34 is turned by rotation of the bolt head 35, and may thus be jammed hard and fast against the face of the closure cap. When thus jammed the bolt cannot be loosened except by aid of a wrench. The parts are so proportioned and arranged, and the charging holes 31, 32 36 and 37 are so located, that whenever the bolt head is jammed tight against the closure cap, neither hole 36 nor 37 can be in registry with either of the holes 31 or 32; yet when the bolt is loosened by aid of a wrench, as above described, a very slight rotary movement of the bolt head is adequate to bring either of the holes 36, 37 into registry with one or the other of the holes 31, 32. The proportion of the parts is also such that when either hole in the bolt head is in registry with one of the holes in the closure cap, the other hole of the bolt head is completely out of registry with the other hole in the closure cap.

After the bolt 34 is fitted into the hole 33, the inner or free end of the bolt is headed up, by hammering or otherwise, to form a button 38—the bolt still having a sufficient length, however, to enable it to be turned freely within suitable limits. This arrangement prevents the bolt from becoming lost in the event that it happens to be loose while the vehicle is traveling.

I prefer to use a thick, pasty lubricant, which is forced into the compartment 27, 28 or 29, as the case may be, by aid of a syringe, preferably of the type shown in Fig. 6. The body portion of the syringe appears at 39, and is fitted with a valvular piston 40. A filler cap 41 is mounted upon the body portion 39, and extending through the filler cap is a revoluble threaded stem 42, provided with a thumb piece 43. The body portion 39 is provided with a discharge nozzle 44, of proper form and size to extend through the charging holes 31, 32, 36, 37 in order to introduce the lubricant into the grease compartment of the hub. The syringe is actuated by turning the thumb piece 43.

The operation of my device is as follows: The various parts of the hub being assembled and arranged as above described, and a quantity of grease being disposed within the grease compartment 27, 28 or 29, the rotation of the hub and also the various accidental endwise movements of the hub, relatively to the spindle 8, cause more or less pressure to be exerted upon the grease, and as a consequence the latter is driven properly in between the hub and spindle. Suppose, now, that the operator desires to replenish the grease in the grease compartment of the hub. He places a wrench on the bolt head 35, turns the bolt slightly, and brings one of the holes 36, 37 into registry with one of the holes 31, 32. He next inserts the nozzle 44 of the syringe through the two holes thus brought into registry—say the holes 31 and 36 according to Fig. 5—and by actuating the syringe causes grease to flow therefrom into the hub compartment, thus completely or partially filling the same.

It is of course desirable that while the grease is being forced into the hub compartment it should not be permitted to escape therefrom. It is because of this fact that I so arrange the parts that when one of the holes 31, 32 is open the other is necessarily closed.

As the hub compartment can not be filled except while the hub is stationary, and as the hub after rotating may stop in any one of innumerable positions, it may happen that in some positions the filling may be more easily accomplished than in others. It is desirable, however, that the charging hole 31, or 32, when used for introducing the grease, be located at a level higher than the axis of the bolt 34, or at least should not be at the lowest level it can reach. When one of the holes 31 or 32 is at its lowest level, the other is approximately at its highest level. The uppermost of the two holes is therefore selected, and the bolt head 35 adjusted accordingly. If both holes 31, 32 are at the same level, either of them may be used for purposes of filling, the hole not used being closed as above explained.

I do not limit myself to the exact construction shown, the scope of my invention being commensurate with my claims.

Having thus described my invention, what I claim as new and desire to secure by Letters Patent is as follows:

1. In an axle oiler the combination, with a hub having a grease compartment and a charging hole communicating with said grease compartment, of a bolt supported by said hub and revoluble relatively thereto, said bolt having a head covering said charging holes and provided with a plurality of charging holes each adapted to be brought into registry with said first mentioned charging hole, to facilitate the introduction of a lubricant into said grease compartment.

2. In an axle oiler the combination, with a hub having a grease compartment, of a closure cap carried by said hub and normally closing said compartment, said cap having a charging hole extending through it so as to communicate with said grease compartment, said cap being also provided with a threaded bolt hole, a bolt extending into said bolt hole and having a revoluble head covering said charging hole, said bolt being further provided with a plurality of charging holes each adapted to be brought into registry with said charging hole in said closure cap.

3. The combination of a hub provided with a grease compartment, a closure cap carried by said hub and normally closing said compartment, said closure cap having a plurality of charging holes in order that some one of said charging holes may be in a position favorable for charging regardless of the position occupied by the hub, a bolt carried by the closure cap and provided with a head revoluble relatively to said cap, said head having a plurality of charging holes each adapted to be brought into registry with any one of said first mentioned charging holes selected by the operator through which to introduce a lubricant into said grease compartment.

4. The combination of a hub provided with a grease compartment, a closure cap carried by said hub and normally closing said compartment, said closure cap having a plurality of charging holes in order that some one of said charging holes may be in a position favorable for charging regardless of the position occupied by the hub, said closure cap being further provided with a threaded hole, a threaded bolt extending into said threaded hole and provided with a head disposed adjacent said closure cap, said bolt being revoluble in order to jam said head thereof against said closure cap, said head being provided with a plurality of charging holes each adapted to register with any charging hole in said closure cap, the distribution of the charging holes being such that whenever any hole of the head is in registry with either hole of the cap, no other hole of the head can be in registry with any hole in the cap.

JOHN J. McGUIRE.

Copies of this patent may be obtained for five cents each, by addressing the "Commissioner of Patents, Washington, D. C."